United States Patent
Altman (10) Patent No.: US 9,396,316 B1
(45) Date of Patent: Jul. 19, 2016

(54) SECONDARY USER AUTHENTICATION BYPASS BASED ON A WHITELISTING DEVIATION FROM A USER PATTERN

(71) Applicant: Google Inc., Mountain View, CA (US)

(72) Inventor: Alon Altman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/796,368

(22) Filed: Mar. 12, 2013

Related U.S. Application Data (60) Provisional application No. 61/619,897, filed on Apr. 3, 2012.

(51) Int. Cl.
G06F 21/31 (2013.01)

(52) U.S. Cl.
CPC .................................... G06F 21/316 (2013.01)

(58) Field of Classification Search
CPC ............................... G06F 21/31; G06F 21/316
See application file for complete search history.

(56) References Cited

U.S. PATENT DOCUMENTS

| | | | |
|---|---|---|---|
| 8,613,064 B1* | 12/2013 | Roy ................................... | 726/7 |
| 8,621,586 B1* | 12/2013 | Peer et al. ........................ | 726/7 |
| 2006/0015743 A1* | 1/2006 | Camaisa et al. ............... | 713/182 |
| 2007/0192588 A1* | 8/2007 | Roskind et al. ............... | 713/155 |
| 2008/0155651 A1* | 6/2008 | Wasmund ........................ | 726/2 |
| 2009/0049544 A1* | 2/2009 | Kashi .............................. | 726/19 |
| 2009/0199264 A1* | 8/2009 | Lang ................................ | 726/1 |
| 2011/0016534 A1* | 1/2011 | Jakobsson et al. ............. | 726/28 |
| 2011/0296003 A1* | 12/2011 | McCann et al. ............... | 709/224 |
| 2012/0290712 A1* | 11/2012 | Walter et al. .................. | 709/224 |
| 2012/0297484 A1* | 11/2012 | Srivastava ...................... | 726/23 |

* cited by examiner

Primary Examiner — Robert Leung
(74) Attorney, Agent, or Firm — Patent Law Works LLP (57) ABSTRACT

A system and method for bypassing secondary user authentication based at least in part on the detection of a whitelisting deviation from a user pattern are disclosed. In one implementation, the system includes a pattern determination module, a fraudulent login identifier module, a whitelisting deviation detection module and a user authentication generation module. The pattern determination module determines a user pattern. The fraudulent login identifier module identifies a potentially fraudulent login and triggers a secondary authentication challenge. The whitelisting deviation detection module compares user information to the user pattern and determines based on the comparison whether a whitelisting deviation from the user pattern has occurred. The user authentication generation module generates and sends a secondary user authentication challenge responsive to the identification of a potentially fraudulent login by the fraudulent login identification module unless bypassed responsive to the determination that a whitelisting deviation has occurred.

31 Claims, 6 Drawing Sheets

SECONDARY USER AUTHENTICATION BYPASS BASED ON A WHITELISTING DEVIATION FROM A USER PATTERN

This application claims the benefit under 35 U.S.C. §119 (e) of U.S. Patent Application No. 61/619,897, entitled "User Authentication Bypass Based on a Whitelisting Deviation from a User Pattern" filed Apr. 3, 2012, the entire contents of which are incorporated herein by reference.

BACKGROUND

The specification relates to online user authentication.

A potential security concern for an online businesses or service is account hijacking, e.g., a fraudulent user gaining access to an account using the account owner's correct credentials (e.g. username and password). Systems have been developed to identify potentially fraudulent login attempts at the time of login and take further steps to authenticate the user, e.g., by requiring the user to complete a secondary user authentication challenge.

However, a problem is that current systems create false positives, which inconvenience account owners by subjecting the account owners to unnecessary secondary authentication challenges. Secondary authentication challenges that in some circumstances may be difficult to successfully complete regardless of whether a user is an account owner or a fraudulent user. More specifically, a problem is that current systems do not bypass secondary user authentication based at least in part on the detection of a whitelisting deviation from a user pattern.

SUMMARY

The specification overcomes the deficiencies and limitations of the prior art at least in part by providing a system and method for bypassing secondary user authentication based at least in part on the detection of a whitelisting deviation from a user pattern.

According to one innovative aspect of the subject matter described in this disclosure, a pattern determination module determines a user pattern, a fraudulent login identifier module identifies a potentially fraudulent login and triggers a secondary authentication challenge, a whitelisting deviation detection module compares user information to the user pattern and determines based on the comparison whether a whitelisting deviation from the user pattern has occurred, and a user authentication generation module generates and sends a secondary user authentication challenge responsive to the identification of a potentially fraudulent login by the fraudulent login identification module unless bypassed responsive to the determination that a whitelisting deviation has occurred.

In general another innovative aspect of the subject matter described in this disclosure may be embodied in methods that include determining a user pattern, identifying a potentially fraudulent login attempt, comparing user information to the user pattern, determining based on the comparison that a whitelisting deviation from the user pattern has occurred, and bypassing a secondary user authentication challenge process triggered by the potentially fraudulent login attempt based on the determination.

Other aspects include corresponding methods, systems, apparatus, and computer program products. These and other implementations may each optionally include one or more of the following features. For instance, the operations further include: determining that an account owner has resumed the user pattern, and sending a notification to the account owner, wherein the notification notifies that secondary user authentication was bypassed. For instance, the features include: the potentially fraudulent login comprises one or more user identifiers, the potentially fraudulent login comprises a correct username and password, the user pattern is a pattern specific to an account owner, the user pattern includes a pattern describing a generalized user, the whitelisting deviation is based at least in part on one or more of an action and an event, the whitelisting deviation is based at least in part on information relating to a previous login, the whitelisting deviation is based at least in part on the absence of one or more of an action and an event, the whitelisting deviation is based at least in part on the user not logging in, the secondary authentication challenge process is bypassed for a limited period, the limited period is based at least in part on time, the limited period is based at least in part on an event, the limited period is based at least in part on a number of logins, the notification further comprises one or more of details concerning why secondary authentication was bypassed and instructions to re-secure the account.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

A system and method for bypassing secondary user authentication based at least in part on the detection of a whitelisting deviation from a user pattern are described. In the following description, for purposes of explanation, numerous specific details are set forth in order to provide a thorough understanding of the implementations. It will be apparent, however, to one skilled in the art that the implementations can be practiced without these specific details. In other instances, structures and devices are shown in block diagram form in order to avoid obscuring the implementations. For example, one implementation is described below with reference to user interfaces and particular hardware. However, the present implementations apply to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

System Overview

Figure 1:
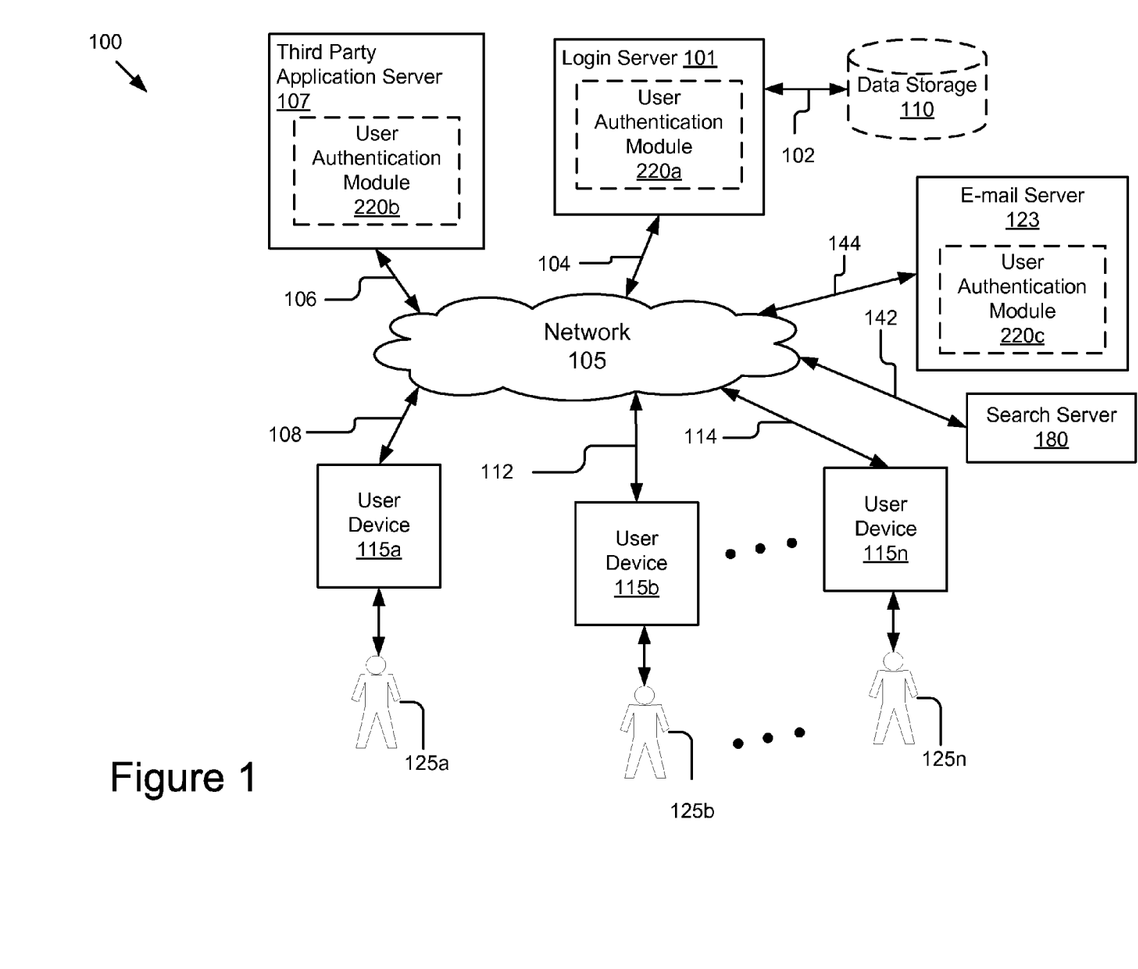
FIG. 1 is a block diagram illustrating an example system for bypassing secondary user authentication based at least in part on the detection of a whitelisting deviation from a user pattern according to some implementations.

FIG. 1 illustrates a block diagram of a system 100 for bypassing secondary user authentication based at least in part on the detection of a whitelisting deviation from a user pattern according to some implementations. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), a login server 101, a search server 180, an e-mail server 123 and a third party server 107. In the illustrated implementation, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the login server 101, the search server 180, the e-mail server 123 and the third party server 107, in practice any number of networks 105 can be connected to the entities. Furthermore, while only one third party server 107 is shown, the system 100 can include any number of third party servers 107.

Although only one login server 101 is shown, it will be recognized that multiple servers may be present. In some implementations, the login server 101 includes, or is included within, a social network. A social network is any type of social structure where the users are connected by a common feature. Examples include, but are not limited to, blogs, microblogs and Internet forums. The common feature includes friendship, family, a common interest, etc.

In some implementations, a user authentication module 220a is included in the login server 101 and is operable on the login server 101, which is connected to the network 105 via signal line 104. In some implementations, the user authentication module 220b is included in the third party application server 107 and is operable on the third party application server 107, which is connected to the network 105 via signal line 106. In some implementations, the user authentication module 220c is included in the e-mail server 123 and is operable on the e-mail server 123, which is connected to the network 105 via signal line 144. In some implementations, a user authentication module (not shown) may be included in the search server 180 and is operable on the search server 180, which is connected to the network 105 via signal line 142. It will be recognized that the user authentication module 220a/220b/220c (referred to generally as the user authentication module 220) can be stored in any combination on the servers and user devices 115. In some implementations, the user authentication module 220 includes multiple, distributed modules that cooperate with each other to perform the functions described below. Details describing the functionality and components of the user authentication module 220 are explained in further detail below with regard to FIG. 3.

The network 105 enables communications between user devices 115, the login server 101, the user application servers 130, the search server 180, the e-mail server 123 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 105 can also include links to other networks.

In some implementations, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (e.g., terrestrial or satellite-based transceivers). In some implementations, the network 105 is an IP-based wide or metropolitan area network.

In some implementations, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated implementation, the user devices 115a, 115b and 115n are coupled to the network 105 via signal lines 108, 112 and 114, respectively. The user 125a can interact with the user device 115a. Similarly, the user 125b can interact with the user device 115b, and the user 125n can interact with the user device 115n. The third party application server 107 is communicatively coupled to the network 105 via signal line 106. The e-mail server 123 is communicatively coupled to the network 105 via signal line 144. The search server 180 is communicatively coupled to the network 105 via signal line 142. The login server 101 is communicatively coupled to the network 105 via signal line 104. In some implementations, the login server 101 is communicatively coupled to data storage 110 via signal line 102.

In some implementations, the data storage 110 stores data and information of each user 125 of the login server 101, which may be used to determine one or more of a user pattern and a whitelisting deviation therefrom. In some implementations, the stored data and information includes identifying information associated with each user 125. Examples of identifying information include, but are not limited to, one or more of IP address(es), service(s), browser cookie(s), user devices number(s), etc. In some implementations, the information stored in data storage 110 also includes the user's list of current and past contacts and the user's activities within the system 100, including, for example, one or more of when the user log in, what services the user uses and what other users the user contacts. In some implementations, which is discussed below, a storage device 214 (see FIG. 2) is included in the login server 101 (e.g., a computing device) and the storage device 214 stores the data and information of users 125 of the login server 101.

In some implementations, a user device 115a, 115b, or 115n is an electronic computing device having a web browser for interacting with the various servers 101, 107, 123, 180 and user devices 115 of the system 100 via the network 105 and is used by a user 125 to access information in the system 100. The user device 115a, 115b, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network. A server can also be a computing device. It will be recognized that other types of client devices 115 are possible. In some implementations, the system 100 includes a combination of different types of client devices 115. For example, a combination of a personal computer, a mobile phone and a tablet computer. The user 125 is a human user of the user device 115.

Example Login Server 101

Figure 2:
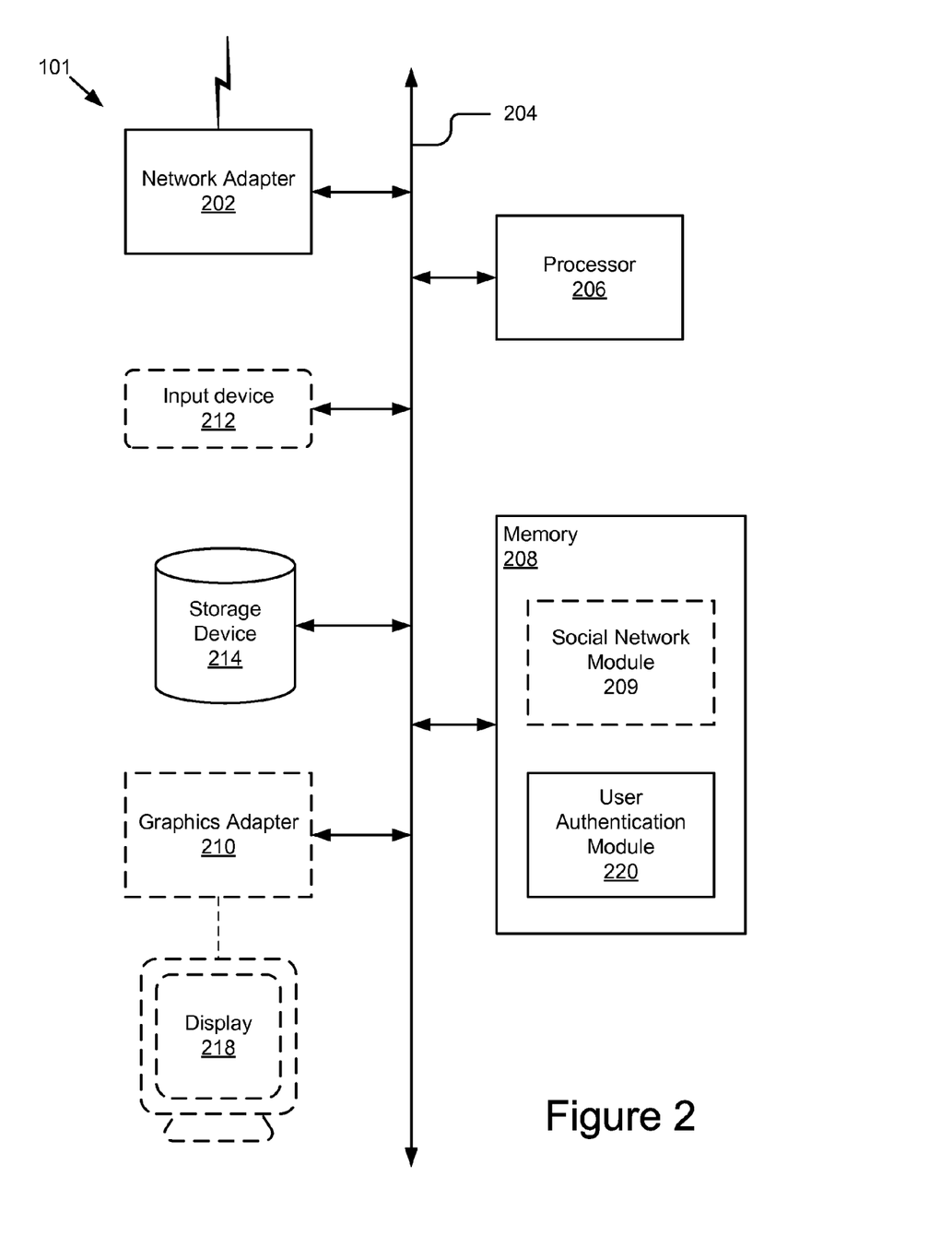
FIG. 2 is a block diagram illustrating an example computing device according to some implementations.

FIG. 2 is a block diagram of a login server 101 according to some implementations. As illustrated in FIG. 2, the login server 101 includes a network adapter 202 coupled to a bus 204. According to some implementations, also coupled to the bus 204 are at least one processor 206, a memory 208, a graphics adapter 210, an input device 212 and a storage device 214. In some implementations, the memory 208 includes a user authentication module 220 and an optional social network module 209. In some implementations, the functionality of the bus 204 is provided by an interconnecting chipset. The login server 101 also includes a display 218, which is coupled to the graphics adapter 210.

The processor 206 may be any general-purpose processor. The processor 206 includes an arithmetic logic unit, a microprocessor, a general purpose controller or some other processor array to perform computations and execute code and routines. The processor 206 is coupled to the bus 204 for communication with the other components of the login server 101. Processor 206 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The login server 101 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory 208 is a non-transitory storage medium. The memory 208 holds instructions and/or data that may be executed by the processor 206. In some implementations, the instructions and/or data stored on the memory 208 include code for performing any and/or all of the techniques described herein. The memory 208 may be a dynamic random access memory (DRAM) device, a static random access memory (SRAM) device, flash memory or some other memory device. In some implementations, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device for storing information on a more permanent basis. The memory 208 is coupled by the bus 204 for communication with the other components of the login server 101. In some implementations, the user authentication module 220 is stored in memory 208 and executable by the processor 206. In some implementations, the optional social network module 209 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and includes one or more devices including a hard disk drive, a floppy disk drive, a CD-ROM device, a DVD-ROM device, a DVD-RAM device, a DVD-RW device, a flash memory device, or some other mass storage device. In some implementations, the storage device stores data and information of users 125 of the login server 101 occasionally referred to herein as "user information." For example, the user information discussed above in reference to data storage 110. The user information stored, whether on a storage device 214 or in data storage 110 (depending on the implementation and login server 101), may be used to determine one or more of a user pattern and a whitelisting deviation therefrom. For example, in some implementations, the storage device 214 of the login server 101 stores one or more of IP address(es), service(s), browser cookie(s), user devices number(s) associated with a user and what services the user uses.

The input device 212 may include a mouse, track ball, or other type of pointing device to input data into the login server 101. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the login server 101 to a local or wide area network.

The user authentication module 220 is code and routines executable by the processor 206 for bypassing secondary user authentication based at least in part on the detection of a whitelisting deviation from a user pattern. In some implementations, the user authentication module 220 is a set of instructions executable by the processor 206. In some implementations, the user authentication module 220 is stored in the memory 208 and is accessible and executable by the processor 206. Details describing the functionality and components of the user authentication module 220 are explained in further detail below in reference to FIG. 3.

A login server 101 can have different and/or other components than those shown in FIG. 2. For example, the computing device can have speakers or another form of audio output. In addition, the login server 101 can lack certain illustrated components. For example, in some implementations, the login server 101 is a login server 101 and lacks an input device 212, graphics adapter 210 and/or display 218. Moreover, the storage device 214 can be local and/or remote from the login server 101 (e.g., a storage area network (SAN)).

The login server 101 is adapted to execute computer program modules for providing the functionality described herein. As used herein, the term "module" refers to computer program logic utilized to provide the specified functionality. Thus, a module can be implemented in hardware, firmware, and/or software. In some implementations, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Example User Authentication Module

Figure 3:
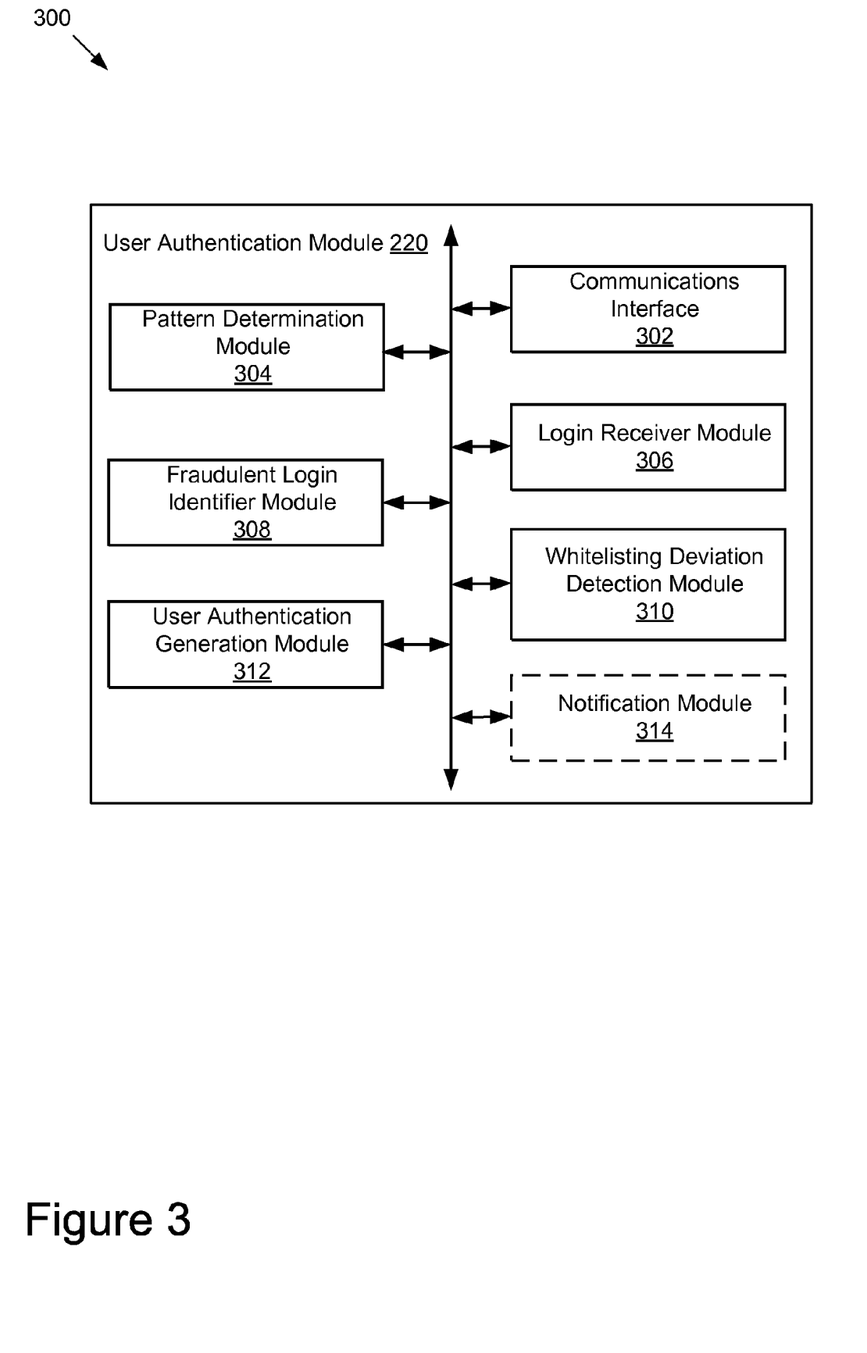
FIG. 3 is a block diagram illustrating a user authentication module according to some implementations.

Referring now to FIG. 3, the user authentication module 220 is shown in more detail. FIG. 3 is a block diagram of the user authentication module 220 included in a login server 101.

In some implementations, the user authentication module 220 includes a communications interface 302, a pattern determination module 304, a login receiver module 306, fraudulent login identifier module 308, a whitelisting deviation detection module 310, a user authentication generation module 312 and an optional notification module 314.

It will be recognized that the modules 302, 304, 306, 308, 310, 312, 314 included in the user authentication module 220 are not necessarily all on the same login server 101. In some implementations, the modules 302, 304, 306, 308, 310, 312, 314 are distributed across multiple computing devices 200. For example, in some implementations, the pattern determination module 304 is included in one or more of the e-mail server 123 and the search server 180 and the other modules 302, 306, 308, 310, 312, 314 are included in the login server 101. It will be recognized that the preceding is just an example of distributing modules across multiple computing devices 200 and that other examples exist.

In some implementations, the activities of the user authentication module 220 described herein, e.g., the determination of a user pattern, are performed subject to user consent. In some implementations, an account owner is prompted to explicitly allow his/her data and information to be used, e.g., to determine a user pattern, for the authentication of the account owner and/or other users. Further, in some implementations, the account owner may opt into/out of allowing the use of his/her data and information to be used. In some implementations, if an account owner opts out, a generalized user pattern based at least in part on one or more account owners that have opted in will be used to determine whether to bypass a secondary user authentication. For example, depending on the embodiment, the generalized user pattern may be based on all account owners that opt in, a subset of account owners that opted in including for example a class of users whether observed or predetermined, etc. In some implementations, if an account owner opts in, the account owner's user pattern is used alone or, depending on the embodiment, in combination with a generalized user pattern to determine whether to bypass a secondary user authentication. In some implementations, if the account owner opts out, the secondary user authentication challenge will not be bypassed based at least in part on the detection of a whitelisting deviation from a user pattern, and the user may be subjected to more frequent secondary user authentication challenges.

The communication interface 302 is code and routines for handling communications between the pattern determination module 304, the login receiver module 306, the fraudulent login identifier module 308, the whitelisting deviation detection module 310, the user authentication generation module 312, the notification module 314 and other components of the login server 101. In some implementations, the communication interface 302 is a set of instructions executable by the processor 206. In some implementations, the communication interface 302 is stored in the memory 208 and is accessible and executable by the processor 206. Regardless of the implementation, the communication interface 302 is adapted for cooperation and communication with the processor 206, other components of the login server 101 and other components of the user authentication module 220.

The communication interface 302 handles communications between the pattern determination module 304, the login receiver module 306, the fraudulent login identifier module 308, the whitelisting deviation detection module 310, the user authentication generation module 312, the notification module 314 and other components of the login server 101. For example, the communication interface 202 communicates with the pattern determination module 304 and the whitelisting deviation detection module 310 to pass the output of the pattern determination module 304 (e.g., a user pattern) to the whitelisting deviation detection module 310. However, this description may occasionally omit mention of the communication interface 302 for purposes of clarity and convenience. For example, for purposes of clarity and convenience, the above scenario may be described as the pattern determination module 304 passing the user pattern to the whitelisting deviation detection module 310.

The pattern determination module 304 is code and routines for determining a user pattern. In some implementations, the pattern determination module 304 is a set of instructions executable by the processor 206. In some implementations, the pattern determination module 304 is stored in the memory 208 and is accessible and executable by the processor 206. Regardless of the implementation, the pattern determination module 304 is adapted for cooperation and communication with the processor 206, other components of the login server 101 and other components of the user authentication module 220.

The pattern determination module 304 is code and routines for determining a user pattern. A user pattern may be based at least in part on the repeating events and/or actions of one or more users. For example, a login may be an event and/or logging in may be a user action; therefore, in some implementations, a user pattern may be based at least in part on the login frequency of one or more users. It will be recognized that login is merely one example of an action and/or event and that other examples exist.

In some implementations, the pattern determination module 304 determines a user pattern specific to an account owner, occasionally referred to herein as a "specific user pattern." For example, User A may bypass secondary user authentication based at least in part on the detection of a whitelisting deviation from User A's user pattern, and User B may bypass secondary user authentication based at least in part on the detection of a whitelisting deviation from User B's user pattern. In some implementations, the pattern determination module 304 determines a user pattern that describes a generalized user, occasionally referred to herein as a "generalized user pattern." For example, the pattern determination module 304 create a user pattern for a generalized user based at least in part on aggregate statistics of the users 125a-n of the system 100 and/or the login server 101. In some implementations, the pattern determination module 304 determines a user pattern that describes both a generalized user and a specific account owner. For example, assume User A opted out of having the user's data and information collected and/or used for authentication and User B opted in, in some implementations, the user authentication module will bypass secondary user authentication for User A based at least in part on the detection of a whitelisting deviation from a generalized user pattern, and bypass secondary user authentication for User B based at least in part on the detection of a whitelisting deviation from User B's user pattern. It will be recognized that reference herein to a "user pattern" refers to one or more of a specific user pattern and a general user pattern unless a contrary interpretation is clear contextually.

A user pattern may be based on any number of types of information. Examples of types of information include but are not limited to time, location, device, service, etc. For example, a user pattern may be based on one or more of when the user usually logs in (e.g. time information), from where the user usually logs in (e.g. location information), and the user device identifier of the device from which the user logs in (e.g. device information). It will be recognized that the preceding are merely examples of types of information upon which a user pattern may be based and that other types of information exist.

Examples of time information include but are not limited to frequency, duration, time of day, etc. For example, assume a user typically logs into an account at approximately 9 AM every weekday morning for an hour, in some implementations, the user pattern is based at least in part on frequency (e.g. every weekday and/or five times a week), duration (e.g. one hour), and time of day (e.g. 9 AM). It will be recognized that the preceding are merely examples of time information and other time information exists.

Examples of location information include but are not limited to IP address, user's geographic location, etc. For example, assume a user typically logs into an account from an IP address in Chicago, Ill., in some implementations, the user pattern is based at least in part on the location of the user at login (e.g. an IP address corresponding to Chicago, Ill.). It will be recognized that the preceding are merely examples of location information and other location information exists.

Examples of device information include but are not limited to user device identifier, browser cookies, etc. For example, assume the user device 115 used to login is associated with a number that identifies that user device and the user typically logs in from that device, in some implementations, a user pattern may be based at least in part on a user device identifier (e.g. the user device number of the user device from which the user logs on, browser and plugin version information, screen resolution or a combination of such identifying features). It will be recognized that the preceding are merely examples of device information and other device information exists.

Examples of service information include but are not limited to the services the user utilizes while logged in, browser cookies, etc. For example, assume the user is an avid reader of a particular blogging website and that website leaves a cookie on the browser, in some implementations, the user pattern is based at least in part on the presence of the blogging website's cookie. It will be recognized that the preceding are merely examples of service information and other service information exists.

The pattern determination module 304 may execute at one or more of a login and periodically. In some implementations, the pattern determination module 304 executes at login. For example, when the login receiver module 306 receives a login request, in some implementations, the pattern determination module 304 executes and determines a user pattern. In some implementations, the pattern determination module 304 executes periodically. For example, in some implementations, the whitelisting deviation detection module 310 executes and determines whether a whitelisting deviation has occurred daily, weekly, monthly, etc. It will be recognized that the preceding are merely examples of periods and that other examples exist.

In some implementations, the pattern determination module 304 passes the user pattern to the whitelisting deviation detection module 310. For example, the pattern determination module 304 is communicatively coupled to the whitelisting deviation detection module 310 to send the user pattern to the whitelisting deviation detection module 310. In some implementations, the pattern determination module 304 (or the communication interface 302) stores the user pattern in the storage device 214 (or any other storage medium communicatively accessible). The other modules of the user authentication module 220 including the whitelisting deviation detection module 310 can retrieve the user pattern by accessing the storage device 214 (or other storage medium).

The login receiver module 306 is code and routines for receiving login requests from users 125 of user devices 115. In some implementations, the login receiver module 306 is a set of instructions executable by the processor 206. In some implementations, the login receiver module 306 is stored in the memory 208 and is accessible and executable by the processor 206. Regardless of the implementation, the login receiver module 306 is adapted for cooperation and communication with the processor 206, other components of the login server 101 and other components of the user authentication module 220.

The login receiver module 306 receives login requests from users 125 of user devices 115. In some implementations, a login request is a request to access an online account (e.g., a social network account and/or an e-mail account). In some implementations, the login request includes one or more user identifiers and other login information. For example, in some implementations, the login request may include a username and password (e.g., one or more user identifiers) and the IP address from which the login request was received (e.g., other login information).

A user identifier identifies one or more of an authorized user 125, occasionally referred to herein as "an account owner," and a user account. A user identifier may be based at least in part on one or more of what a user knows (e.g., a password), what a user is (e.g., biometric information) and what a user possesses (e.g., a RFID badge). Examples of user identifiers include but are not limited to a user name and/or password, a user alias, e-mail address, a biometric identifier (e.g., finger print, voice print, retina scan, DNA, etc.), an electronic identifier (e.g., magnetic badge swipe, RFID badge, etc.) or anything else capable of identifying a user and/or user account.

In some implementations, the login request includes other login information in addition to the one or more user identifiers. The other login information is discussed below in reference to the fraudulent login identifier module 308. In some implementations, the other login information is received or retrieved by the fraudulent login identifier module 308 subject to validation of the one or more user identifiers. For example, the login receiver module 306 receives the login request including a username, password and other login information, verifies that the username and password, and subject to successful verification passes the other login information to the fraudulent login identifier module 308.

In some implementations, the login receiver module 306 passes the other login information to one or more of the fraudulent login identifier module 308 and the whitelisting deviation detection module 310. For example, the login receiver module 306 is communicatively coupled to the fraudulent login identifier module 308 to send the other login information to one or more of the fraudulent login identifier module 308 and the whitelisting deviation detection module 310. In some implementations, the login receiver module 306 (or the communication interface 302) stores other login information in the storage device 214 (or any other non-transitory storage medium communicatively accessible). The other modules of the authentication module 220, for example, one or more of the fraudulent login identifier module 308 and the whitelisting deviation detection module 310, can retrieve the other login information by accessing the storage device 214 (or other non-transitory storage medium).

The fraudulent login identifier module 308 is code and routines for identifying a potentially fraudulent login attempt. In some implementations, the fraudulent login identifier module 308 is a set of instructions executable by the processor 206. In some implementations, the fraudulent login identifier module 308 is stored in the memory 208 and is accessible and executable by the processor 206. Regardless of the implementation, the fraudulent login identifier module 308 is adapted for cooperation and communication with the processor 206, other components of the login server 101 and other components of the user authentication module 220.

The fraudulent login identifier module 308 identifies potentially fraudulent login attempts. In some implementations, the fraudulent login identifier module 308 identifies potentially fraudulent login attempts based at least in part on the other login information included in the login request received by the login receiver module 306. For example, the fraudulent login identifier module 308 analyzes the other login information and determines whether the login is potentially fraudulent.

Other login information may include any number of different types of information. For example, the other login information can include but is not limited to one or more of the user device's IP address, the user's geographic location, a user device identifier, browser cookies, etc. For example, the other login information includes that the login is originating from a geographic location known for a high incidence of fraudulent logins and the fraudulent login identifier module 308 identifies the login as potentially fraudulent. In some implementations, the fraudulent login identifier module 308 determines a login is potentially fraudulent by comparing the received other login information with a user's historical other login information. For example, the fraudulent login identifier module 308 compares the user's location or browser cookies to the user's location or browser cookies from previous logins and determines whether the login is potentially fraudulent. For another example, assume the login request includes an IP address or user device identifier from which the user has never logged in, the fraudulent login identifier module 308 determines the login is potentially fraudulent.

In some implementations, the fraudulent login identifier module 308 passes a signal that the login is potentially fraudulent to one or more of the whitelisting deviation detection module 310 and the user authentication generation module 312. For example, the fraudulent login identifier module 308 is communicatively coupled to one or more of the whitelisting deviation detection module 310 and the user authentication generation module 312 to send the signal that the login is potentially fraudulent to the whitelisting deviation detection module 310 and/or the user authentication generation module 312. In some implementations, the fraudulent login identifier module 308 (or the communication interface 302) stores the signal that the login is potentially fraudulent in the storage device 214 (or any other non-transitory storage medium communicatively accessible). The other modules of the user authentication module 220, including one or more of the whitelisting deviation detection module 310 and the user authentication generation module 312, can retrieve the signal that the login is potentially fraudulent by accessing the storage device 214 (or other non-transitory storage medium).

In some implementations, the fraudulent login identifier module 308 passes the other login information to the whitelisting deviation detection module 310. For example, the fraudulent login identifier module 308 is communicatively coupled to the whitelisting deviation detection module 310 to send the other login information to the whitelisting deviation detection module 310. In some implementations, the fraudulent login identifier module 308 (or the communication interface 302) stores the other login information in the storage device 214 (or any other non-transitory storage medium communicatively accessible). The other modules of the user authentication module 220 including the whitelisting deviation detection module 310 can retrieve the other login information by accessing the storage device 214 (or other non-transitory storage medium).

The whitelisting deviation detection module 310 is code and routines for determining whether a whitelisting deviation from a user pattern has occurred. In some implementations, the whitelisting deviation detection module 310 is a set of instructions executable by the processor 206. In some implementations, the whitelisting deviation detection module 310 is stored in the memory 208 and is accessible and executable by the processor 206. Regardless of the implementation, the whitelisting deviation detection module 310 is adapted for cooperation and communication with the processor 206, other components of the login server 101 and other components of the user authentication module 220.

The whitelisting deviation detection module 310 determines whether a whitelisting deviation from a user pattern has occurred. In some implementations determining whether a whitelisting deviation from a user pattern has occurred includes obtaining user information and comparing user information to a user pattern.

In some implementations, the whitelisting deviation detection module 310 obtains user information associated with one or more of the account owner and the user attempting the potentially login. Examples of user information associated with the account owner include but are not limited to one or more of information about an account owners past activities, IP address(es) associated with the account owner, geographic location(s) associated with the account owner, user device identifier(s) associated with the account owner, browser cookies associated with the account owner, etc. For example, the whitelisting deviation detection module 310 obtains user information associated with one or more of the preceding account owner information from the storage device 214 of the login server 101. It will be recognized that the preceding are merely examples of user information associated with the account owner and other examples exist.

Examples of user information associated with the user attempting the potentially fraudulent login include but are not limited to one or more of the IP address associated with the login, the geographic location associated with the login, the user device identifier associated with the login, browser cookies associated with the login, etc. In some implementations, the whitelisting deviation detection module 310 obtains one or more of the preceding user information associated with the user attempting the potentially fraudulent login as other login information from one or more of the login receiver module 306 and the fraudulent login identifier module 308. In some implementations, the whitelisting deviation detection module 310 obtains one or more of the preceding user information associated with the user attempting the potentially fraudulent login itself. It will be recognized that the preceding are merely examples of user information associated with the user attempting the potentially fraudulent login and that other examples exist.

In some implementations, the user authentication generation module 312 compares the obtained user information to the user pattern in order to determine whether a whitelisting deviation from a user pattern has occurred. For example, the whitelisting deviation detection module 310 compares the account owner's past activities (e.g. the account owner's previous login(s)) to a user pattern and determines whether a whitelisting deviation has occurred based at least in part on the comparison (e.g., whether a previous login deviated from the user pattern). It will be recognized that the preceding was merely an example of a comparison and other examples exist.

A whitelisting deviation is a deviation from the user pattern that indicates that the potentially fraudulent login is unlikely to be fraudulent and/or likely to be legitimate. For example, in some implementations, a whitelisting deviation is based at least in part on one or more of credible information, an action and the absence of an action. It will be recognized that the preceding are merely examples of bases for determining whether a whitelisting deviation has occurred and other examples exist.

In some implementations, a whitelisting deviation is based at least in part on credible information. In some implementations, credible information is information that indicates that a subsequent deviation is unlikely to be fraudulent. For example, assume the whitelisting deviation detection module 310 determines the location of the potentially fraudulent login attempt deviates from the account owner's specific user pattern, in some implementations, the whitelisting deviation detection module 310 obtains information associated with the account owner's activities which include service information that the account owner has used one or more travel websites, in some implementations, the whitelisting deviation detection module 310 determines that a whitelisting deviation has occurred, because the account owner's usage of a travel website service may indicate that the account owner is now traveling.

In some implementations, credible information is information that indicates that a current deviation is unlikely to be fraudulent. In some such implementations, credible information may be user information that is common to both the account owner and the user attempting the potentially fraudulent login and indicates that the user attempting the login is the account owner. For example, assuming the whitelisting deviation detection module 310 determines that the location of the potentially fraudulent login attempt deviates from the account owner's specific user pattern, in some implementations, the whitelisting deviation detection module 310 obtains a browser cookie from the browser from which the login request was received and the browser cookie(s) associated with the account owner. In some such implementations, the whitelisting deviation detection module 310 determines a whitelisting deviation occurred when a match is present, because the match may indicate that the account owner is traveling.

In some implementations, the whitelisting deviation includes an action. For example, assume an account owner's users pattern is to login at approximately 9 AM and at approximately 1 PM every day from a location in Chicago, Ill. that is not an airport or other transportation hub; however, the account owner deviated from the user pattern by logging in (e.g. an act) from an airport at 9 AM. Also, assume that a subsequent login was received from Salt Lake City, Utah (based on other login information), and the fraudulent login identifier module 308 identified the login as potentially fraudulent. In some implementations, the deviation (e.g. logging in from an airport) makes it more likely that the subsequent login is legitimate and may, therefore, be a whitelisting deviation. For example, the deviation may indicate that the account owner has traveled to Salt Lake City, Utah. It will be recognized that the preceding is merely an example of a whitelisting deviation including an action and that other examples exist.

In some implementations, the whitelisting deviation includes the lack, or absence, of an action. For example, assume an account owner's users pattern is to login from San Francisco, Calif. at approximately 9 AM and at approximately 1 PM every day; however, the account owner deviated from the user pattern by not logging in (e.g. a lack of the action) this afternoon. Also, assume that a login request was received at 4 PM from New York, N.Y. (based on other login information), and the fraudulent login identifier module 308 identified the login as potentially fraudulent. In some implementations, the deviation (e.g. not logging in that afternoon) makes it more likely that the subsequent login is legitimate and may, therefore, be a whitelisting deviation. For example, the deviation may indicate that the account owner did not login that afternoon because the account owner was traveling to New York.

For another example, assume the generalized user pattern is that 99.9% of users log in once every week and 50% login at least once a day; however, the account owner has deviated from that user pattern by not logging in for 2 weeks. In some implementations, the whitelisting deviation detection module 310 determines that the account owner's deviation from logging in once a week is a whitelisting deviation and secondary user authentication will be bypassed for the next potentially fraudulent login attempt.

For yet another example, assume the account owner's user pattern is to login twice every day; however, the account owner has deviated from that user pattern by not logging in for 5 days. Also, assume that over those five days one or more potentially fraudulent login attempts have been identified (e.g. based on an atypical geographic location) and resulted in the issuing of secondary user authentication challenges that were failed by the user. In some implementations, the whitelisting deviation detection module 310 determines that the account owner's deviation from logging in twice a day for 5 days is a whitelisting deviation and secondary user authentication will be bypassed for the next potentially fraudulent login, because, for example, the 5 day period without the account owner logging in and the failed secondary user authentication may indicate the user was attempting the login but was unable to complete the secondary authentication challenges. In some such implementations, a notification will be issued, which is discussed in detail in reference to the optional notification engine 314. It will be recognized that the preceding are merely examples of whitelisting deviation including an absence of action and that other examples exist.

Moreover, it will be recognized that the 5 day period is merely an example of a threshold and that other examples exist. For example, the threshold may be predefined by the account owner in user settings or by a system administrator. For another example, the threshold may be based at least in part on the user pattern. For example, assume the measure of the user pattern is one day because the user pattern is to log in once a day, in some implementations, the threshold for determining when a deviation becomes a whitelisting deviation may be a multiple (e.g. 3) of the measure of the user pattern (e.g. three days).

In some implementations, the whitelisting deviation occurs before the potentially fraudulent login. For example, the previous example in which the whitelisting deviation occurred when the account owner deviated from his/her specific user pattern by not logging in at the normal time. It will be recognized that the preceding is merely an example of a whitelisting deviation occurring before a potentially fraudulent login attempt and other examples exist.

The whitelisting deviation detection module 310 executes at one or more of a login and periodically. In some implementations, the whitelisting deviation detection module 310 executes at login. For example, when a potentially fraudulent login attempt is detected by the fraudulent login identifier module 308, in some implementations, the whitelisting deviation detection module 310 executes and determines whether a whitelisting deviation has occurred. In some implementations, the whitelisting deviation detection module 310 executes periodically. For example, in some implementations, the whitelisting deviation detection module 310 executes and determines whether a whitelisting deviation has occurred daily, weekly, monthly, etc. It will be recognized that the preceding are merely examples of periods and that other examples exist.

In some implementations, when the whitelisting deviation detection module 310 determines that a whitelisting deviation from a user pattern has occurred and secondary authentication should be bypassed the whitelisting deviation detection module 310 generates a bypass signal. In some implementations, the bypass signal may be associated with the login. For example, the bypass signal indicates that secondary user authentication should be bypassed for the present login. In some implementations, the bypass signal may be associated with the user. For example, the bypass signal indicates that the secondary user authentication should be bypassed for the user for a limited period.

In some implementations, the whitelisting deviation detection module 310 passes the bypass signal to the user authentication generation module 312. For example, the whitelisting deviation detection module 310 is communicatively coupled to the user authentication generation module 312 to send the bypass signal to the user authentication generation module 312. In some implementations, the whitelisting deviation detection module 310 (or the communication interface 302) stores the bypass signal in the storage device 214 (or any other non-transitory storage medium communicatively accessible). The other modules of the user authentication module 220 including the user authentication generation module 312 can retrieve the bypass signal by accessing the storage device 214 (or other non-transitory storage medium).

The user authentication generation module 312 is code and routines for one or more of generating sending and evaluating the completion of a secondary user authentication challenge. In some implementations, the user authentication generation module 312 is a set of instructions executable by the processor 206. In some implementations, the user authentication generation module 312 is stored in the memory 208 and is accessible and executable by the processor 206. Regardless of the implementation, the user authentication generation module 312 is adapted for cooperation and communication with the processor 206, other components of the login server 101 and other components of the authentication module 220.

In some implementations, the user authentication generation module 312 generates a secondary user authentication challenge. In some implementations, the user authentication generation module 312 generates a secondary user authentication challenge when the whitelisting deviation detection module 310 determines that a whitelisting deviation has not occurred (e.g., no bypass signal was received/retrieved).

In some implementations, the user authentication generation module 312 also sends the secondary user authentication challenge to be completed by the user. In some such implementations, the user authentication generation module 312 generates a secondary user authentication challenge responsive to the identification of a potentially fraudulent login attempt regardless of whether the whitelisting deviation detection module 310 determines that a whitelisting deviation has occurred; however, the user authentication generation module 312 sends the secondary user authentication challenge based on the determination of the whitelisting deviation detection module 310. For example, in some implementations, the user authentication generation module 312 sends the generated secondary user authentication challenge when the whitelisting deviation detection module 310 determines no whitelisting deviation from the user pattern occurred (e.g., no bypass signal was received/retrieved), and the user authentication generation module 312 does not send the secondary user authentication challenge when the whitelisting deviation detection module 310 determines that a whitelisting deviation from the user pattern has occurred (e.g., a bypass signal was received/retrieved).

In some implementations, the user authentication generation module 312 sends the secondary authentication challenge for presentation to the user 125. For example, the user authentication generation module 312 is communicatively coupled to the user device 115 to send the secondary authentication challenge to the user device 115. In some implementations, the user authentication generation module 312 (or the communication interface 302) stores the secondary authentication challenge in the storage device 214 (or any other non-transitory storage medium communicatively accessible). The other components of the system 100, e.g., the communication interface 302, can request the secondary authentication challenge, which is retrieved by accessing the storage device 214 (or other non-transitory storage medium), and send the secondary authentication challenge for presentation to the user 125.

In some implementations, bypassing secondary user authentication may include allowing a user to access to an account using a potentially fraudulent login attempt without subjecting the user to a secondary user authentication challenge. In some implementations, bypassing secondary user authentication may include subjecting a user to a less rigorous secondary user authentication challenge.

In some implementations, the bypass is for a limited period. In some implementations, the limited period is based at least in part on one or more of time and an event. In some implementations, the limited period is based at least in part on time. For example, a determination that a whitelisting deviation has occurred bypasses secondary user authentication for 3 days. In some implementations, the limited period is based at least in part on an event. For example, a determination that a whitelisting deviation has occurred bypasses secondary user authentication for a specified number of logins. For another example, a determination that a whitelisting deviation has occurred bypasses secondary user authentication until the user resumes the user pattern (e.g. resumes logging in from a typical location) and/or a new user pattern is established (e.g. continues logging in from the new IP address, which may indicate the user has moved).

Therefore, the specification beneficially teaches that a deviation from a user pattern may be an indication of legitimacy and/or lack of fraud rather than an indicator of fraud as is conventionally disclosed. The specification assumes that a fraudulent user is unable to alter an account owner's user pattern, short of locking the user out of an account, and effectively reduces the number of false positives for identified potentially fraudulent logins and the burden and inconvenience of an account owner having to authenticate himself/herself.

In some implementations, the user authentication generation module 312 determines whether the secondary user authentication has been successfully completed by the user (e.g. proving the user is likely the account owner) and permitting the account owner to access the account. In some implementations, when a secondary user authentication challenge is not sent, the user is allowed access to the account without having to successfully complete a secondary user authentication challenge (e.g. the secondary user authentication is bypassed).

The optional notification module 314 is code and routines for notifying an account owner that secondary user authentication has been bypassed. In some implementations, the notification module 314 is a set of instructions executable by the processor 206. In some implementations, the notification module 314 is stored in the memory 208 and is accessible and executable by the processor 206. Regardless of the implementation, the notification module 314 is adapted for cooperation and communication with the processor 206, other components of the login server 101 and other components of the user authentication module 220.

The optional notification module 314 may notify an account owner that secondary user authentication has been bypassed. In some implementations, the notification module 314 notifies an account owner that secondary user authentication has been bypassed when the account owner resumes the user pattern. In some implementations, the notification module 314 obtains the user pattern and user login requests from one or more of the pattern determination module 304, the login receiver module 310 and a storage device 214 and determines when the account owner resumes a user pattern. For example, assume the user pattern was to login daily from the U.S. and the account owner deviated by not logging in for three days, a potentially fraudulent login request from an atypical location was received and bypassed based on the deviation which was whitelisted, in some implementations, the notification module 314 notifies the account owner that the secondary user authentication was bypassed when the account owner resumes the user pattern by logging in from a typical location. The notification beneficially provides an added measure of security, because in the event that a fraudulent user was granted access based on whitelisting the potentially fraudulent login, when the account owner logs in the account owner will be notified that the account has been accessed and may take steps to re-secure the account.

In some implementations, the notification may include one or more of details concerning why the login was whitelisted and instructions to re-secure the account. For example, the notification may read "Secondary user authentication was bypassed for a login from NY last Wednesday because we assumed you were traveling. If you did not log in from NY, please follow this link." It will be recognized that the preceding is merely an example of a notification and that other examples exist.

In some implementations, the notification module 314 sends the notification for presentation to the user 125. For example, the notification module 314 is communicatively coupled to the user device 115 to send the notification to the user device 115. In some implementations, the notification module 314 (or the communication interface 302) stores the notification in the storage device 214 (or any other non-transitory storage medium communicatively accessible). The other components of the system 100, e.g., the communication interface 302, can request the notification, which is retrieved by accessing the storage device 214 (or other non-transitory storage medium), and send the notification for presentation to the user 125.

Figure 6:
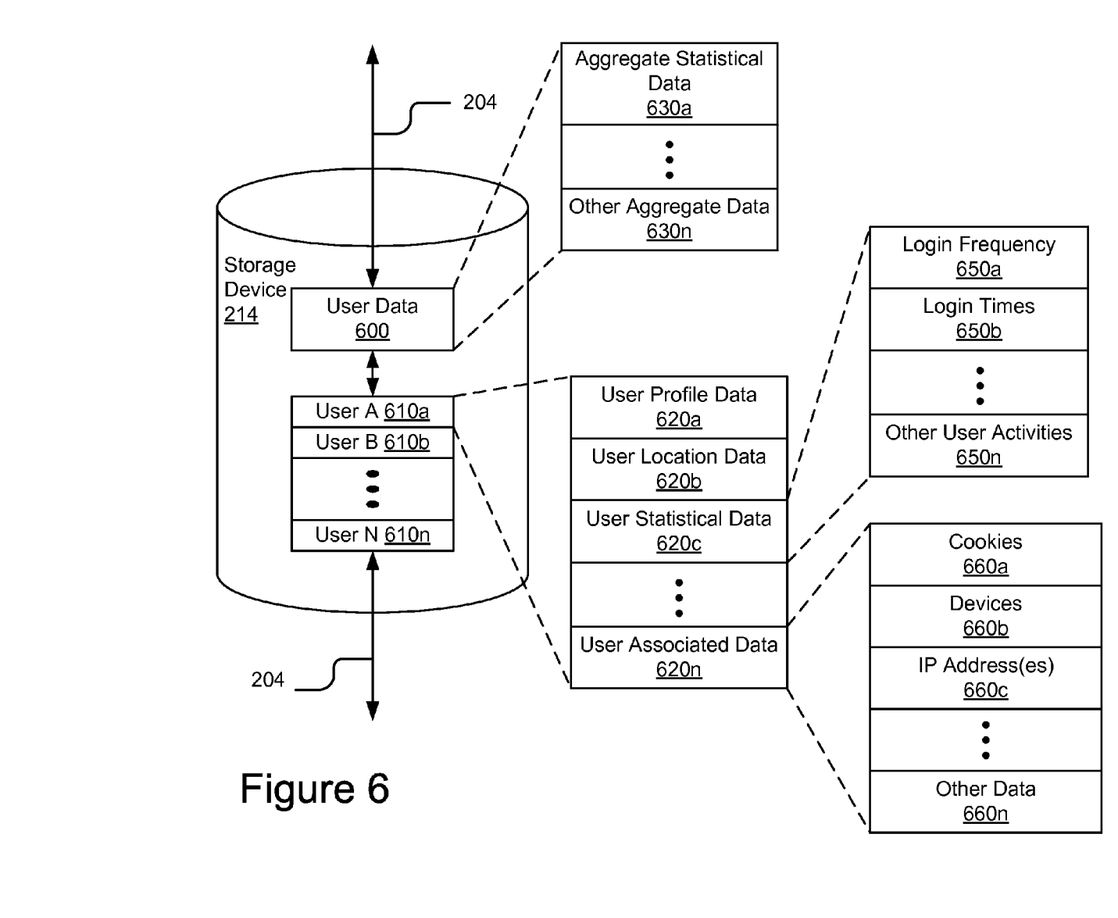
FIG. 6 is a block diagram illustrating an example storage device storing user data and information on a storage device in the system according to some implementations.

FIG. 6 illustrates an example of a storage device 214 storing user data 600. In some implementations, the user data includes data belonging to account owner User A 610*a*. In this example, User A's data 610*a* includes data for the User A's profile 620*a*, location 620*b*, user statistics 620*c*, as well as other data 620*n* associated with User A. In some implementations, the user statistical data 620*c* includes data regarding User A's login frequency 650*a*, login times 650*b* and statistics that may define other user activities 650*n*. In some implementations, the other data associated with User A 620*n* includes data regarding one or more of the cookies 660*a*, devices 660*b*, IP address(es) and other data 660*n* associated with the User A. In some implementations, the user data 600 includes aggregated data that describes the Users A-N in aggregate. In some such implementations, the aggregated data includes aggregate statistical data 630*a* and other aggregate data 630*n*. For example, the aggregate statistical data 630*a* includes user statistical data 620*c* aggregated from Users A-N to define the login pattern of a generalized user.

It will be recognized that although User A's data 610*a* is shown including a data structure including multiple other types of data, the data for other users, e.g., User B's data 610*b* and User N's data 610*n*, may include the same or similar data structures and data. It will be further recognized that the preceding is merely an example of the kind of data and data structure possible in a storage device 214 and that other examples exist. For example, in some implementations, the data structure may be different and/or include more, less, different or other data types and categories.

Example Processes

Figure 4:
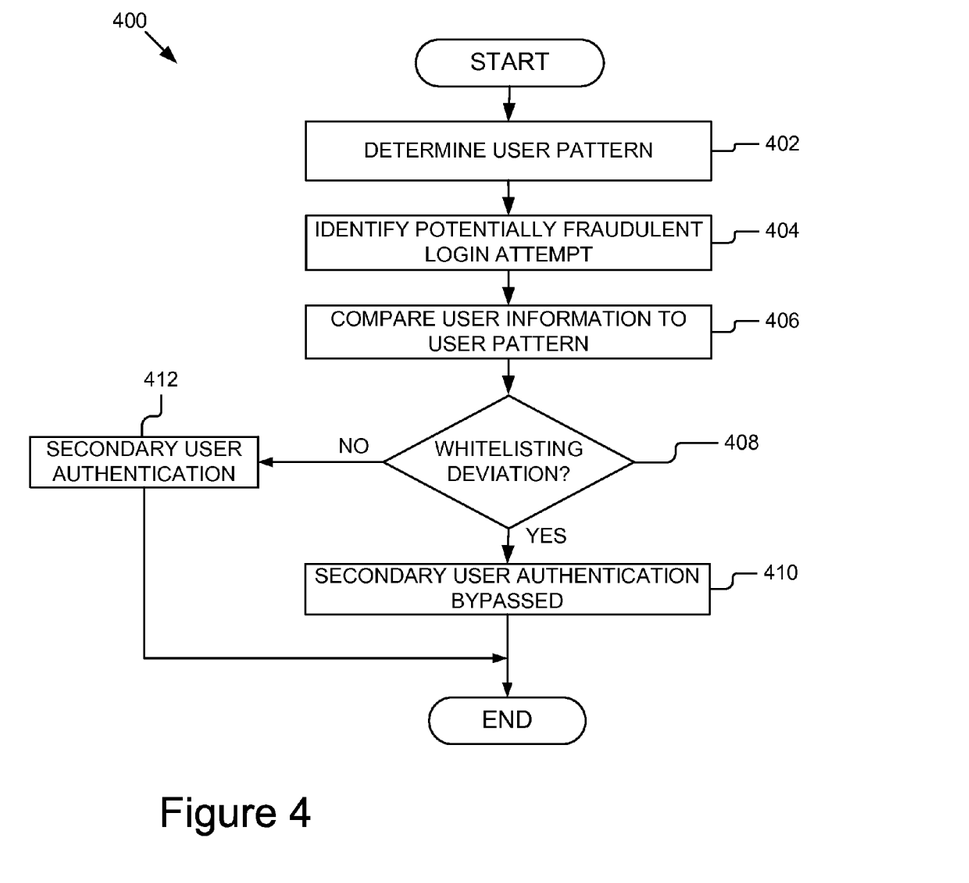
FIG. 4 is a flow chart illustrating an example method for bypassing secondary user authentication based at least in part on the detection of a whitelisting deviation from a user pattern according to some implementations.
Figure 5:
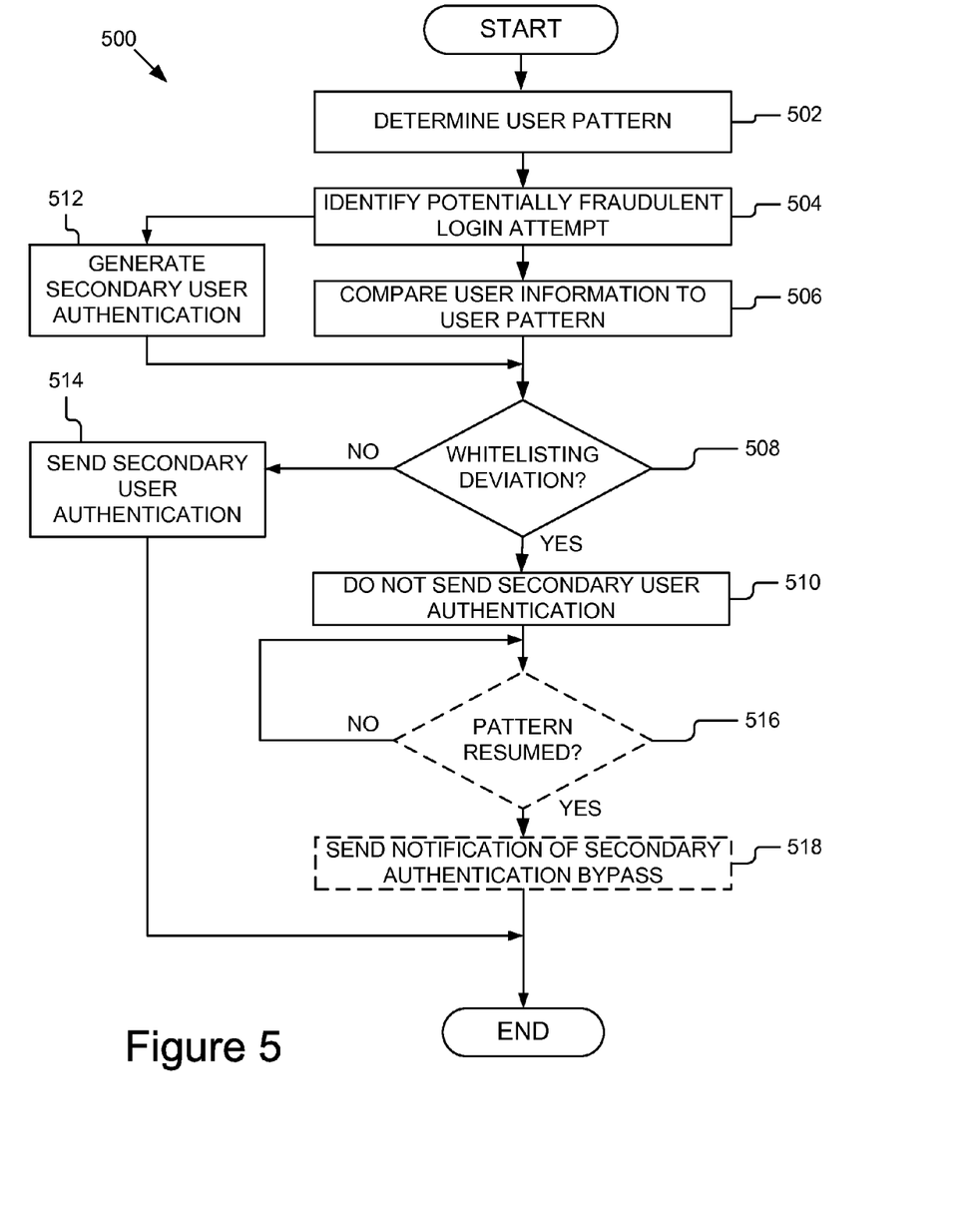
FIG. 5 is a flow chart illustrating another example method for bypassing secondary user authentication based at least in part on the detection of a whitelisting deviation from a user pattern according to some implementations.

FIGS. 4 and 5 depict various methods 400, 500 performed by the system described above in reference to FIGS. 1-3 and 6. Steps that are optional or performed by optional modules are depicted in dashed boxes.

FIG. 4 is a flow chart illustrating a method 400 for bypassing secondary user authentication based at least in part on the detection of a whitelisting deviation from a user pattern according to some implementations. At step 402, the pattern determination module 304 of the authentication module 220 determines a user pattern. At step 404, the fraudulent login identifier module 308 identifies a login attempt as potentially fraudulent based at least in part on the other login information received by the login receiver module 306. At step 406, the whitelisting deviation detection module 310 compares user information to the user pattern determined at step 402. At step 408, the whitelisting deviation detection module 310 determines whether a whitelisting deviation has occurred based at least in part on the comparison at step 406. If the whitelisting deviation detection module 310 determines a whitelisting deviation occurred (408-Yes), the secondary user authentication is bypassed at step 410. If the whitelisting deviation detection module 310 determines a whitelisting deviation has not occurred (408-No), the user is authenticated using secondary user authentication at step 412.

FIG. 5 is a flow chart illustrating another method 500 for bypassing secondary user authentication based at least in part on the detection of a whitelisting deviation from a user pattern according to some implementations. At step 502, the pattern determination module 304 of the authentication module 220 determines a user pattern. At step 504, the fraudulent login identifier module 308 identifies a login attempt as potentially fraudulent based at least in part on the other login information received by the login receiver module 306. Responsive to the identification of a potentially fraudulent login at step 504, the user authentication generation module 312 generates a secondary user authentication. At step 506, the whitelisting deviation detection module 310 compares user information to the user pattern determined at step 502. At step 508, the whitelisting deviation detection module 310 determines whether a whitelisting deviation has occurred based at least in part on the comparison at step 506. If the whitelisting deviation detection module 310 determines a whitelisting deviation has not occurred (508-No), the secondary user authentication generated at step 512 is sent to the user at step 514. If the whitelisting deviation detection module 310 determines a whitelisting deviation occurred (508-Yes), the secondary user authentication generated at step 512 is not sent to the user at step 510.

In some implementations, the optional notification module 314 is present and determines whether the account owner has resumed the user pattern at step 516. If the notification module 314 determines the account owner has not resumed the user pattern (516-No), no action is taken. If the notification module 314 determines the account owner has resumed the user pattern (508-Yes), the notification module 314 sends a notification to the account owner to notify the account owner that secondary user authentication was bypassed.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement some implementations or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A method comprising:
   determining, using one or more computing devices, a user pattern;
   identifying a potentially fraudulent login attempt;
   comparing user information to the user pattern;
   determining, based on comparing the user information to the user pattern, that a deviation from the user pattern has occurred and the deviation has occurred prior to the potentially fraudulent login attempt;
   determining whether the deviation is a whitelisting deviation by identifying information indicating that the potentially fraudulent login attempt is likely to be legitimate;
   responsive to the deviation being the whitelisting deviation, bypassing a secondary user authentication challenge process triggered by the potentially fraudulent login attempt.

2. The method of claim 1, the method further comprising:
   determining that an account owner has resumed the user pattern; and sending a notification to the account owner, wherein the notification notifies that secondary user authentication was bypassed.

3. The method of claim 1, wherein the potentially fraudulent login comprises one or more user identifiers.

4. The method of claim 1, wherein the potentially fraudulent login comprises a correct username and password.

5. The method of claim 1, wherein the user pattern is a pattern specific to an account owner.

6. The method of claim 1, wherein the user pattern includes a pattern describing a generalized user.

7. The method of claim 1, wherein the whitelisting deviation is based at least in part on one or more of an action and an event.

8. The method of claim 1, wherein the whitelisting deviation is based at least in part on information relating to a previous login.

9. The method of claim 1, wherein the whitelisting deviation is based at least in part on the absence of one or more of an action and an event.

10. The method of claim 1, wherein the whitelisting deviation is based at least in part on the user not logging in.

11. The method of claim 1, wherein the secondary user authentication challenge process is bypassed for a limited period.

12. The method of claim 11, wherein the limited period is based at least in part on time.

13. The method of claim 11, wherein the limited period is based at least in part on an event.

14. The method of claim 11, wherein the limited period is based at least in part on a number of logins.

15. The method of claim 2, wherein the notification further comprises details concerning why secondary user authentication was bypassed.

16. A computer program product comprising a non-transitory computer readable medium encoding instructions that, in response to execution by a computing device, cause the computing device to perform operations comprising:
   determining a user pattern;
   identifying a potentially fraudulent login attempt;
   comparing user information to the user pattern;
   determining, based on comparing the user information to the user pattern, that a deviation from the user pattern has occurred and the deviation has occurred prior to the potentially fraudulent login attempt;
   determining whether the deviation is a whitelisting deviation by identifying information indicating that the potentially fraudulent login attempt is likely to be legitimate;
   responsive to the deviation being the whitelisting deviation, bypassing a secondary user authentication challenge process triggered by the potentially fraudulent login attempt.

17. A system for account recovery, the system comprising:
   a processor;
   a memory storing instructions executable by the processor;
   a pattern determination module, executable by the processor, operable to determine a user pattern;
   a fraudulent login identifier module, executable by the processor, operable to identify a potentially fraudulent login and trigger a secondary authentication challenge;
   a whitelisting deviation detection module, executable by the processor, operable to compare user information to the user pattern, determine based on comparing the user information to the user pattern whether a deviation from the user pattern has occurred prior to the potentially fraudulent login and over a threshold period of time, the threshold period of time being defined based on the user pattern, and determine whether the deviation is a whitelisting deviation by identifying information indicating that the potentially fraudulent login is likely to be legitimate, the whitelisting deviation detection module communicatively coupled to a user device to receive the user information and communicatively coupled to the pattern determination module to receive the user pattern;
   a user authentication generation module, executable by the processor, operable to generate and send a secondary user authentication challenge responsive to the identification of a potentially fraudulent login by the fraudulent login identification module unless bypassed responsive to the deviation being the whitelisting deviation, the user authentication generation module communicatively coupled to the fraudulent login identifier module and the whitelisting deviation detection module.

18. The system of claim 17 further comprising a notification module operable to determine when an account owner has resumed the user pattern and to send a notification to the account owner that secondary user authentication was bypassed.

19. The system of claim 17, wherein the potentially fraudulent login comprises one or more user identifiers.

20. The system of claim 17, wherein the potentially fraudulent login comprises a correct username and password.

21. The system of claim 17, wherein the user pattern is a pattern specific to an account owner.

22. The system of claim 17, wherein the user pattern includes a pattern describing a generalized user.

23. The system of claim 17, wherein the whitelisting deviation is based at least in part on one or more of an action and an event.

24. The system of claim 17, wherein the whitelisting deviation is based at least in part on information relating to a previous login.

25. The system of claim 17, wherein the whitelisting deviation is based at least in part on the absence of one or more of an action and an event.

26. The system of claim 17, wherein the whitelisting deviation is based at least in part on the user not logging in.

27. The system of claim 17, wherein the secondary user authentication challenge process is bypassed for a limited period.

28. The system of claim 27, wherein the limited period is based at least in part on time.

29. The system of claim 27, wherein the limited period is based at least in part on an event.

30. The system of claim 27, wherein the limited period is based at least in part on a number of logins.

31. The system of claim 18, wherein the notification further comprises details concerning why secondary authentication was bypassed.

* * * * *